METHOD OF PRODUCING A BROAD AREA LOW RESISTANCE CONTACT TO A SILICON SEMICONDUCTOR BODY

Filed April 25, 1960

GERALD P. PIGHINI, INVENTOR.

By Spensley and Horn

ATTORNEYS.

United States Patent Office 3,071,854
Patented Jan. 8, 1963

3,071,854

METHOD OF PRODUCING A BROAD AREA LOW RESISTANCE CONTACT TO A SILICON SEMICONDUCTOR BODY

Gerald Pio Pighini, Redondo Beach, Calif., assignor to Pacific Semiconductors, Inc., Culver City, Calif., a corporation of Delaware Filed Apr. 25, 1960, Ser. No. 24,465
7 Claims. (Cl. 29—473.1)

This invention relates to semiconductor devices and more particularly to an improved method for fabricating a large area low resistance contact to the surface of a body of silicon semiconductor material.

It has long been desirable for many types of semiconductor devices to make contact thereto in a manner which is advantageous thermally, electrically and mechanically in order to produce devices which are capable of relatively high power dissipation. In order to produce a device having a high power dissipation, it has been found that the efficiency of such a device hinges materially upon the thermal and electrical resistance of the contact. It has therefore been found necessary to produce an electrical contact over a broad area of the semiconductive body, the contact combining good mechanical strength with a thermal resistance of the order of one tenth of a ° C./watt. It has also been desired to produce a contact of the character described which is resistant to etchants typically used in the semiconductor industry, such as one consisting of a combination of acids.

For the sake of clarity of explanation and by way of example only, this invention will be described with reference to the production of a broad area, low resistance contact between a metallic header and the collector region of a diffused junction silicon transistor. It is to be expressly understood that the invention is equally applicable to other semiconductor devices such as rectifiers, photocells, diodes and the like. Additionally, the method of the present invention may be used to produce a broad area contact of the character described upon a silicon body without reference to any other contacting member.

It is well known to produce contacts of the character described using gold. In order to bond gold to a silicon body it has heretofore been necessary during the heating cycle to abrade or rub the silicon wafer over the gold. This is believed to be required in order to break down the oxide on the silicon and to provide intimate contact between the gold and silicon. This rubbing or abrading method is typically clumsy and slow if done by hand and has proved to be difficult and expensive to automate, the problems increasing as the area to be bonded increases. Thus, the oxide layer on a silicon body must be broken down and dissolved in order to bring the gold in contact with the silicon.

It is therefore a primary object of the present invention to provide an improved technique for increasing the wettability of gold to a silicon semiconductive body to produce an electrical contact thereto.

Another object of the present invention is to provide an improved method for providing a large area, low resistance contact between a silicon body and a metallic heat sink.

A further object of the present invention is to provide an improved, broad area back contact for a silicon semiconductive electrical translating device.

A still further object of the present invention is to provide an improved method of providing a low thermal resistance, broad area back contact to a silicon high power transistor.

Yet a further object of the present invention is to provide a relatively low temperature technique for producing a broad area, low resistance bond between a silicon semiconductor translating device and a metallic heat sink.

The novel features which are believed to be characteristic of the present invention, both as to its organization and method of operation, together with further objects and advantages thereof, will be better understood from the following description considered in connection with the accompanying drawing. It is to be expressly understood, however, that the drawing is for the purpose of illustration and example only, and is not intended as a definition of the limits of the invention.

Figures 1, 2, 3, 4, 5, 6, 7:
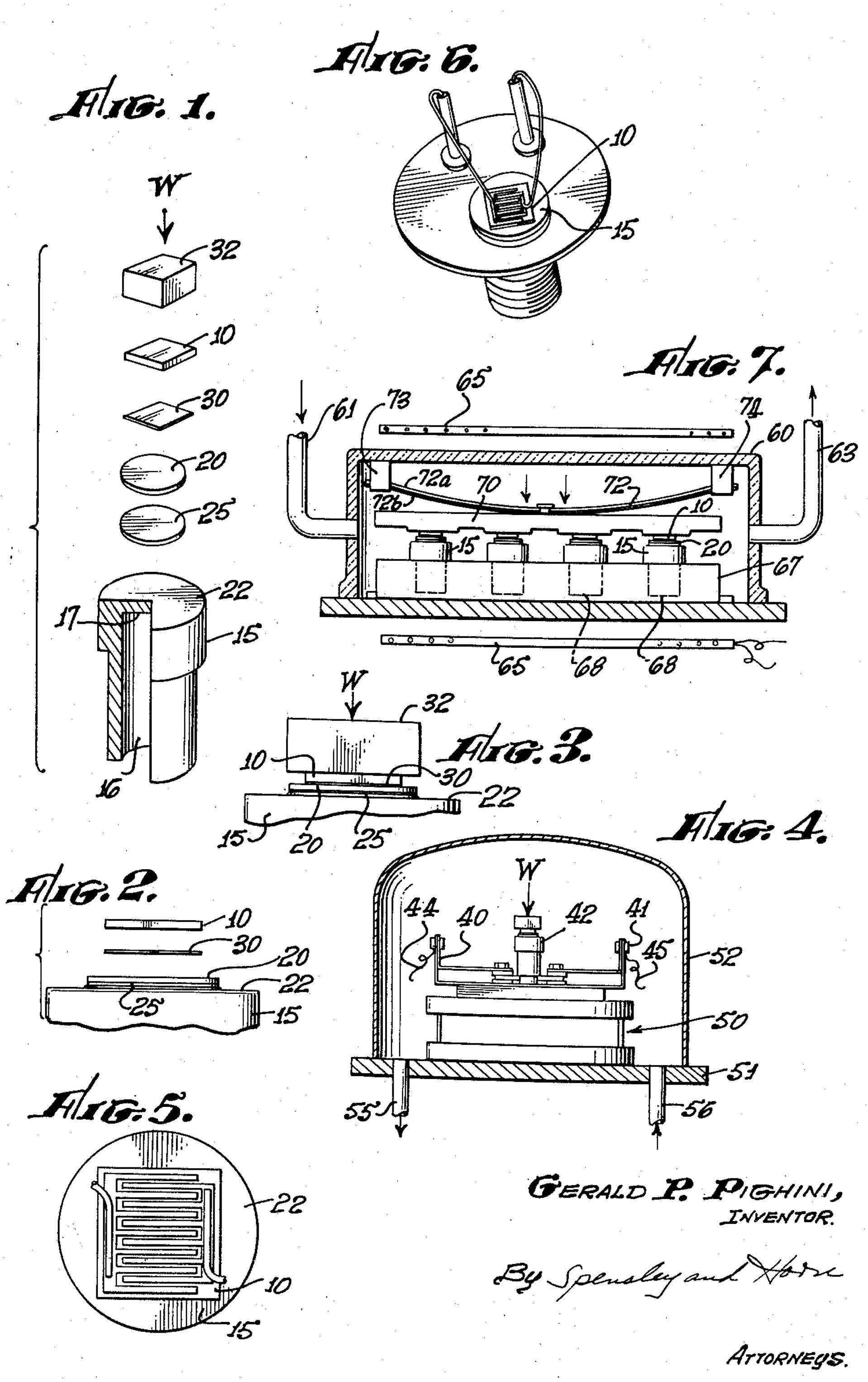
FIGURE 1 is an exploded assembly view showing the various elements employed in producing a low resistance contact in accordance with the presently preferred embodiment of this invention.
FIGURE 2 is an enlarged elevation view showing the parts from FIGURE 1 during an intermediate stage of production.
FIGURE 3 is an enlarged assembly view during a later stage of production.
FIGURE 4 is a view, partly in section, of a presently preferred apparatus for mounting a transistor in accordance with this invention.
FIGURE 5 is a plan view showing a silicon transistor structure mounted upon a header in accordance with the presently preferred embodiment of this invention.
FIGURE 6 is a perspective view of the mounted transistor of FIGURE 5 as it would appear when connected to electrodes forming part of the overall transistor assembly; and, FIGURE 7 is a view, partly in section, of an alternative apparatus for carrying out the present invention.

This invention, in part, involves the discovery that the addition of nickel to gold when bonding the same to silicon greatly enhances the wettability of the gold. While it is well known to bond gold to silicon, it has heretofore been found necessary to abrade the silicon and gold together. This was believed to be required because of the inevitable presence of oxide upon the silicon which inhibits contact between the gold and the underlying "real" silicon surface. This oxide must, it is believed, be broken down in order to obtain a broad area low resistance contact.

The addition of nickel to gold when bonding to silicon results in a dissolution of the silicon oxide. It is further believed that the nickel acts as a nucleating source during regrowth of the parent silicon and that it also lowers the surface tension of the gold-silicon alloy which is formed during the heating step.

An exemplary bonding operation for producing a broad area low resistance contact to the collector region of a diffused junction power transistor will now be described in order to more fully explain the present invention. It will be appreciated by one skilled in the art that the present invention bond is not necessarily limited to diffused junction transistors, but may, in fact, be advantageously employed in the production of the contacts to other silicon devices including diodes, transistors, photocells, and the like. In addition, it may be used for meltback junction, grown junction and point contact devices in the production of either front or back or any other contacts thereto.

Referring now to the drawings, there is shown in FIGURE 1 an exploded assembly view of the various parts employed in carrying out the mounting of a diffused junction transistor 10 to a metal header stud 15. In this embodiment the transistor wafer 10 to be mounted is a one-quarter inch square of a thickness of approximately 0.005 inch. It has previously had produced therein an N-P-N "comb" structure in accordance with prior art diffusion techniques, which form no part of the present invention. A plan view of the wafer 10 showing the comb-like structure is shown by FIGURE 5. In order to provide efficient heat dissipation, the header stud 15 is typically made of a metal such as copper. As copper has a relatively high thermal coefficient of expansion and as silicon has a relatively low thermal coefficient of expansion, it has been found desirable to provide a buffer element between those two materials. A thin wafer of molybdenum has been found to be particularly suited as the buffer element. There is thus provided a ⅜ inch diameter, 0.010 inch thick wafer of molybdenum 20. The wafer 20 is first secured to the upper surface 22 of the copper stud 15 by brazing. In order to braze the molybdenum wafer or buffer element 20 to the surface 22, a thin wafer shaped preform 25 of a silver-copper-phosphorous alloy is used. The preform is ⅜ inch in diameter and 0.003 inch in thickness. The molybdenum wafer element 20 is placed atop the preform 25 which in turn is disposed upon the surface 22 of the stud 15. The subassembly consisting of the stud, the preform and the wafer is then raised to the brazing temperature of approximately 700° C. for from 2–3 minutes and then permitted to cool to room temperature. The resulting structure will now appear as shown in FIGURE 2.

One feature of the present invention resides in the use of a molybdenum wafer element which is nickel-clad as will be more fully explained hereafter. After the nickel-clad molybdenum element 20 is secured to the surface 22 of the stud 15, the silicon transistor 10 is ready for mounting. The transistor 10 and a ¼ inch by ¼ inch gold foil 30 of a thickness of 0.001 inch are both placed upon the nickel-clad molybdenum wafer element 20. Atop the silicon transistor 10 there is disposed a quartz flat 32 and finally a weight is placed upon the quartz flat 32. In this specific embodiment a weight of 128 grams is used in order to exert a pressure of approximately 300 grams per square centimeter upon the transistor body 10. With the silicon under pressure resting upon the nickel-clad molybdenum wafer and with the thin gold foil therebetween, the entire assembly is heated to a temperature in the range from 400° C. to 475° C., and preferably around 425° C., this temperature being above the lowest melting point of the ternary silicon-nickel-gold system which is approximately 377° C., the latter temperature being the melting point of gold-silicon eutectic. This heating operation is preferably carried out under the following conditions. The temperature is maintained for approximately 30 seconds while the atmosphere surrounding the assembly is a vacuum of approximately $10^{-4}$ millimeters of mercury. During the first 30 seconds the mounting has effectively taken place as an alloy including gold, nickel and silicon is produced. With the thus produced gold-silicon-nickel alloy still in the molten state, the assembly is quenched with helium gas, and the heat source is removed. The temperature will thus fall from approximately 425° C. to approximately 200° C. in about three minutes. The assembly is then removed from the helium atmosphere and is permitted to cool to room temperature in open air. Room temperature will be reached in approximately ten minutes. FIGURE 6 shows how the transistor of FIGURE 5 would appear when connected to electrodes forming part of a typical transistor assembly.

A presently preferred apparatus for carrying out the present invention is shown in FIGURE 4. Therein, an electric resistance heater element including two electrodes 40 and 41 is connected in series with an upstanding cylindrically shaped carbon heating element 42. The electrodes are connected to a source of electric current (not shown) by a pair of leads 44 and 45. The copper header stud 15 defines a hollow recess 16 partly through the length thereof (see FIGURE 1) terminating in an upper wall 17. The inside diameter of the recess 16 is slightly larger than the outside diameter of the element 42. The recess 16 is provided to permit water cooling of the transistor assembly if desired as shown in FIGURE 2 by circulating water into the hollow opening defined by the stud 15.

The heater assembly rests upon a support structure 50 which in turn is disposed upon a base plate 51. Two pipes 55 and 56 permit communication between the chamber, defined by the bell jar 52 and the plate 51, with a vacuum pumping apparatus and/or gas sources not shown, as desired.

While the above process has been described with the nickel source as being the cladding upon the buffer element 20, such is not necessarily required. In fact, the contact need not necessarily be made to a header or to any other element. This invention is primarily concerned with producing a broad area gold contact to a silicon body by the addition of nickel to provide a ternary alloy. For the reasons hereinabove stated, nickel greatly aids in the formation of a continuous, adherent broad area contact to the silicon body.

An alternate apparatus for carrying out the present invention is shown in FIGURE 7. Therein an open tube furnace 60 has provided an inlet pipe 61 and an outlet pipe 63. Surrounding the furnace is a resistance heater element 65 which is connected to a source of current, not shown. A boat 67 is placed within the furnace 60; the boat defines a plurality of recesses 68 to receive an equal number of studs 15 upon each of which has been brazed a nickel clad molybdenum element 20 as has hereinabove been discussed. Atop each of the studs 15 is placed a gold foil and a silicon transistor crystal body 10. An elongate quartz flat 70 is then placed over each of the silicon bodies. The quartz flat 70 is secured in place by a metallic arc shaped spring 72 which is secured to the upper wall of the furnace 60 by a pair of supports 73 and 74. The metallic spring 72 is so designed as to exert a predetermined force due to its flexure at the gold alloy temperature. The spring 72 is a bimetallic strip formed of two materials, **72*a* and 72*b***, which are bonded together. These materials have different coefficients of expansion, thus resulting in a binding, as indicated in FIGURE 7, upon being heated. The temperature for this embodiment is in the range from 400° C. to 550° C. and preferably 500° C.

In operation, forming gas (15% $H_2$ and 85% $N_2$) or argon is made to continuously flow through the furnace. The gas is pumped (by a pump not shown) into the furnace through pipe 61 and exhausted through pipe 63. The gas flow and the alloying temperature as above stated are maintained for approximately five minutes. Thence, the boat 67 is moved within the furnace where the temperature is approximately 200° C. for another 15 minutes during which time the gas flow is maintained. It is then that the mounted studs are removed from the furnace. While a gaseous atmosphere has been mentioned as that preferred within the furnace, it may be more desirable (in order to achieve chemical cleanliness) to provide a vacuum. The latter approach is more expensive and time consuming than the gaseous system which has been found to be most adequate for the purposes stated.

While this invention has been described with reference to nickel as being clad upon another element such is not intended as a limitation. What is important is the provision of a source of nickel be it from plating, from a foil of pure nickel or an alloy of gold and nickel or the like. The nickel should also, it has been found, be controlled in amount relative to the gold. A weight percentage of nickel to gold of from approximately one-half percent to ten percent has been found to be satisfactory for the purposes stated. If an amount in excess of ten percent is used there is a tendency for a flaky bond to be formed.

Actually, the amount of gold and nickel are both determined by the ternary system consisting of the gold, nickel and silicon. Assuming an infinite supply of nickel, gold and silicon, the amounts of the materials are determined by the temperature chosen. That is the amount of nickel and silicon which will be dissolved by the gold is the deciding factor; and this can be determined by one skilled in the art.

What is claimed is:

1. The method of producing a broad area low resistance contact to a silicon semiconductor body, said method including the steps of: placing the silicon semiconductor body and a thin gold foil upon a nickel surface with the gold foil being disposed intermediate said silicon body and said nickel, the weight ratio of gold to nickel being within the range of from about 10:1 to 200:1; pressing said silicon body against said gold foil and said nickel surface to thereby maintain them in an assemblage; heating said assemblage to a temperature above the lowest melting point of the ternary system consisting of gold-nickel-silicon and below the melting point of silicon; and maintaining said assemblage at said temperature until all of the gold combines with all of the available nickel and with sufficient of the silicon to form the ternary gold-silicon-nickel alloy at that temperature.

2. The method of producing a broad area low resistance contact to a silicon semiconductor body, said method including the steps of: placing a thin gold foil upon a nickel-clad element to which the silicon semiconductor body is to be bonded, the weight ratio of gold to nickel being within the range of from about 10:1 to 200:1; placing the silicon semiconductor body upon said gold foil; heating the assemblage including the silicon body, the gold foil and the nickel to a temperature above the lowest melting point of the gold-nickel-silicon system and below the melting point of silicon; and maintaining said assemblage at said temperature until all of the gold combines with all of the available nickel and with sufficient of the silicon to form the ternary gold-silicon-nickel alloy at that temperature.

3. The method of producing a broad area low resistance contact to a silicon semiconductor body, said method including the steps of: placing a thin gold foil upon a nickel-clad element to which the silicon semiconductor body is to be bonded, the weight ratio of gold to nickel being within the range of from about 10:1 to 200:1; placing the silicon semiconductor body upon said gold foil; heating the assemblage including the silicon body, the gold foil and the nickel to a temperature in the range from 400° C. to 550° C.; and maintaining said assemblage at said temperature until all of the gold combines with all of the available nickel and with sufficient of the silicon to form the ternary gold-silicon-nickel alloy at that temperature.

4. The method of producing a broad area low resistance contact to a silicon semi-conductor body, said method including the steps of: placing a thin gold foil upon a nickel-clad element to which the silicon semiconductor body is to be bonded, the weight ratio of gold to nickel being within the range of from about 10:1 to 200:1; placing the silicon semiconductor body upon said gold foil; pressing said body against said foil and said element; heating the assemblage including the silicon body, the gold foil and the nickel to a temperature in the range from 400° C. to 550° C.; and maintaining said assemblage at said temperature until all of the gold combines with all of the available nickel and with sufficient of the silicon to form the ternary gold-silicon-nickel alloy at that temperature.

5. The method of producing a broad area low resistance contact to a silicon semiconductor body, said method including the steps of: placing a thin gold foil upon a nickel-clad element to which the silicon semiconductor body is to be bonded, the weight ratio of gold to nickel being within the range of from about 10:1 to 200:1; placing the silicon semiconductor body upon said gold foil; heating the assemblage including the silicon body, the gold foil and the nickel to a temperature in the range from 400° C. to 475° C. for approximately 30 seconds in a vacuum; and thereafter quenching said assemblage with helium gas for approximately three minutes.

6. The method of producing a broad area low resistance contact to a silicon semiconductor body, said method including the steps of: placing the silicon semiconductor body and a thin gold foil upon a nickel-clad molybdenum element with the gold foil being disposed intermediate said semiconductor body and said molybdenum element, the weight ratio of gold to silicon being within the range of from about 10:1 to 200:1; disposing an inert insulator body upon said silicon semiconductor body; disposing an independently anchored bimetallic strip upon the said insulator body, said bimetallic strip being so adapted and arranged as to exert a predetermined force upon said insulator body at a predetermined temperature; heating the assemblage including the semiconductor body, the gold foil and the nickel-clad molybdenum element in a forming gas atmosphere to a temperature in the range from 400° C. to 550° C. for approximately five minutes; and while maintaining said atmosphere, reducing the temperature to approximately 200° C. for another approximately fifteen minutes.

7. The method of producing a broad area low resistance contact to one surface of a silicon transistor, said method including the steps of: placing said surface of said silicon transistor and a thin gold foil upon a nickel-clad molybdenum element to which said surface is to be bonded, said gold foil being disposed intermediate said surface and said molybdenum element, the weight ratio of gold to nickel being within the range of from about 10:1 to 200:1; disposing an inert insulator body upon said transistor upon a surface opposite said surface to which said bond is to be made; applying a predetermined force upon said insulator body; heating the assemblage including the silicon transistor, the gold foil and the nickel-clad molybdenum element to a temperature in the range from 400° to 475° C. for approximately thirty seconds in a vacuum; and thereafter removing the source of heat utilized for the heating of said assemblage and introducing helium gas in the vicinity of said silicon transistor.

References Cited in the file of this patent

UNITED STATES PATENTS

| | | |
|---|---|---|
| 2,763,822 | Frola et al. | Sept. 18, 1956 |
| 2,863,105 | Ross | Dec. 2, 1958 |

FOREIGN PATENTS

| | | |
|---|---|---|
| 664,913 | Germany | Sept. 7, 1938 |